United States Patent

Rapp et al.

[15] 3,706,889

[45] Dec. 19, 1972

[54] MULTIPLE-PHASE LOGIC CIRCUITS

[72] Inventors: Adolph Karl Rapp, Plymouth Meeting, Pa.; Utpalananda Bharali, Raritan, N.J.

[73] Assignee: RCA Corporation

[22] Filed: Nov. 16, 1970

[21] Appl. No.: 89,596

[52] U.S. Cl. ....................307/205, 307/304

[51] Int. Cl. ....................H03k 19/08

[58] Field of Search...307/205, 221 C, 251, 279, 304

[56] References Cited

UNITED STATES PATENTS

| | | | |
|---|---|---|---|
| 3,517,210 | 6/1970 | Rubinstein | 307/205 |
| 3,579,275 | 5/1971 | Polkinghorn | 307/251 |

*Primary Examiner*—John S. Heyman
*Assistant Examiner*—R. E. Hart
*Attorney*—H. Christoffersen

[57] ABSTRACT

A multiple-phase field-effect transistor logic circuit of the type normally capable of indicating the logic function of a plurality of variables during only a single portion of a clock pulse period is controlled in such a way that the same logic function is also produced during a second portion (which may overlap the first) of the same clock period. This is accomplished by placing one circuit node at a voltage level indicative of the desired function of the variables during a first clock pulse, storing this voltage for a given interval of time following the first clock pulse, and during a second clock pulse within this interval of time, charging the distributed capacitance present at a second circuit node to this same voltage level.

8 Claims, 2 Drawing Figures

Inventors:
ADOLPH K. RAPP &
UTPALANANDA BHARALI
By Samuel Cohen
Attorney

PATENTED DEC 19 1972

3,706,889

Inventors:
ADOLPH K. RAPP &
UTPALANANDA BHARALI
By Samuel Cohen
Attorney

MULTIPLE-PHASE LOGIC CIRCUITS

BACKGROUND OF THE INVENTION

There is often a need, for example in the design of synchronous, sequential logic networks, for indicating the logic function of a set of variables during different clock times. A simple way this may be done is to employ two identical logic networks to which inputs are applied say for the entire clock period and to strobe these circuits during different intervals of this period to produce the desired outputs. The purpose of the present invention is to provide another solution to this problem which is considerably more economical.

SUMMARY OF THE INVENTION

A logic circuit responsive to signals indicative of a plurality of variables during a first time interval produces an output indicative of a logic function of these variables during at least a portion of this time interval. A first control circuit senses the value of this output during one portion of the first time interval and produces an output F indicative of this logic function during a second time interval. A second control circuit senses the value of F during at least a portion of the second time interval and produces an output E indicative of the same logic function during the third time interval different than the second time interval.

DETAILED DESCRIPTION

In the discussion which follows, the binary digit (bit) 1 is represented by a voltage $-V$; the bit 0 is represented by ground level. This convention is, of course, purely arbitrary. For the sake of simplifying the explanation which follows, rather than referring to a signal which represents a bit, the bit itself is sometimes referred to.

Figure 2:
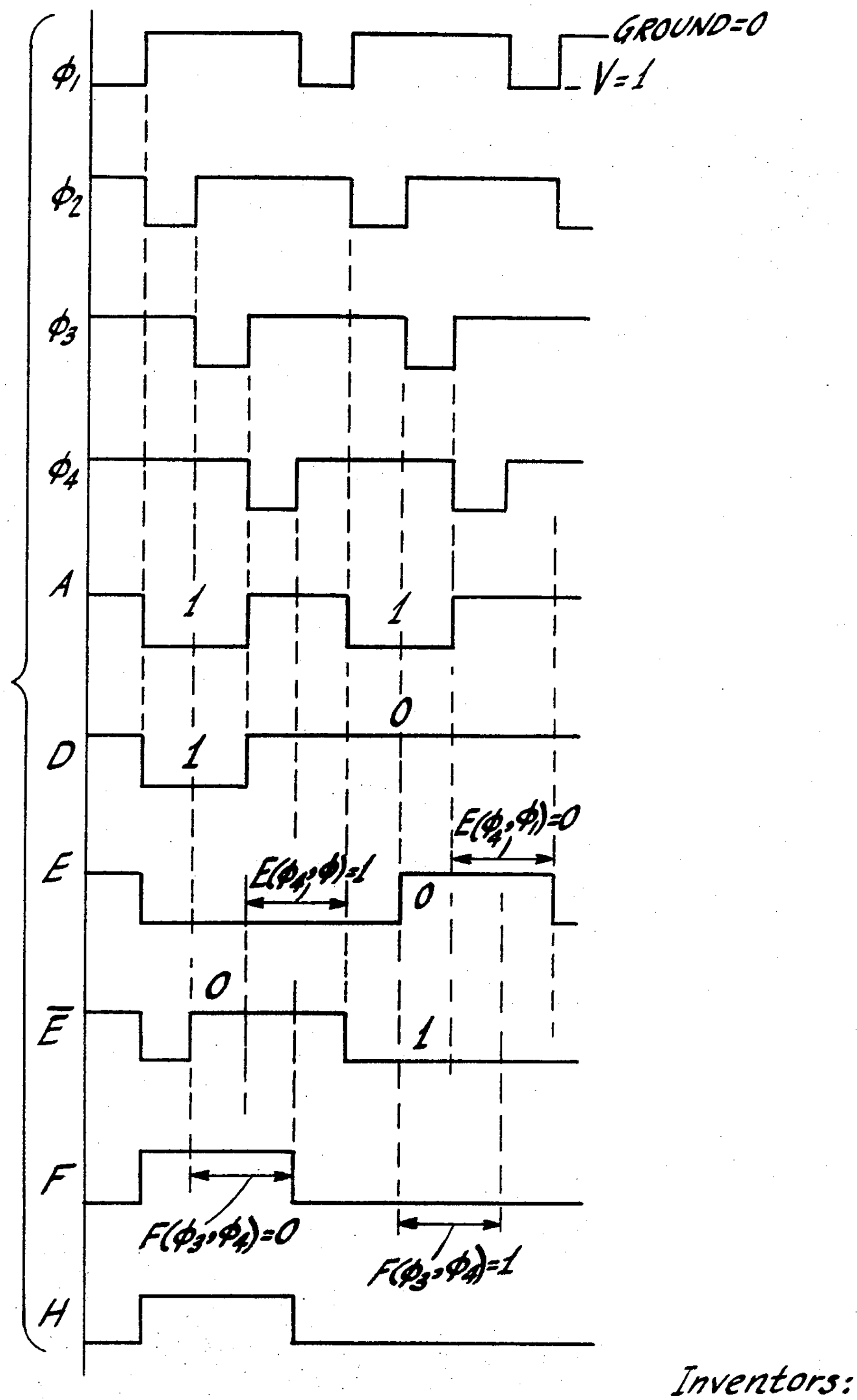
FIG. 2 is a schematic drawing of waveforms present in the circuit of FIG. 1.

In the example of the invention illustrated, the circuits are driven by three of the four non-overlapping clock signals $\phi_1$, $\phi_2$, $\phi_3$, and $\phi_4$ shown in FIG. 2. In the interest of brevity, in the discussion which follows when the $\phi_i$ (or phase $i$) time or period is referred to, what is meant is the time interval during the negative pulse of amplitude $-V$ is present.

In the embodiment of the invention illustrated, P-type metal oxide semi-conductor (P-MOS) field-effect devices of the enhancement type are employed. It is to be understood that this is merely illustrative, as the invention can be practiced with N-type field-effect devices or the other circuit elements. While not essential, the circuit preferably is an integrated circuit and all of the transistors of the circuit may be on a common substrate (a single "chip").

For the purpose of illustrating the invention, it is assumed that it is desired to produce an output signal F indicative of the logic function (A+B+C)D. Further, it is desired that this output signal be available during clock pulses $\phi_3$ and $\phi_4$ (indicated by F ($\phi_3$, $\phi_4$)) and that $\bar{E}$, a signal indicative of the same logic function, be available during clock pulses $\phi_4$ and $\phi_1$ (indicated as $\bar{E}$ ($\phi_4$, $\phi_1$)). In this same example, the variables represented by input signals A, B, C, and D are available during the $\phi_2$ and $\phi_3$ pulses. The signal $\bar{E}$ is not simply a 180° out-of-phase version of the signal $\bar{E}$ as in two-phase logic. However, during the period of interest, namely $\phi_4$, $\phi_1$, the signal E is the logical complement of the signal $\bar{E}$. During this period, when $\bar{E}$ represents binary 1, E represents binary 0 and when $\bar{E}$ represents binary 0, E represents binary 1. The actual waveforms are shown in FIG. 2.

Figure 1:
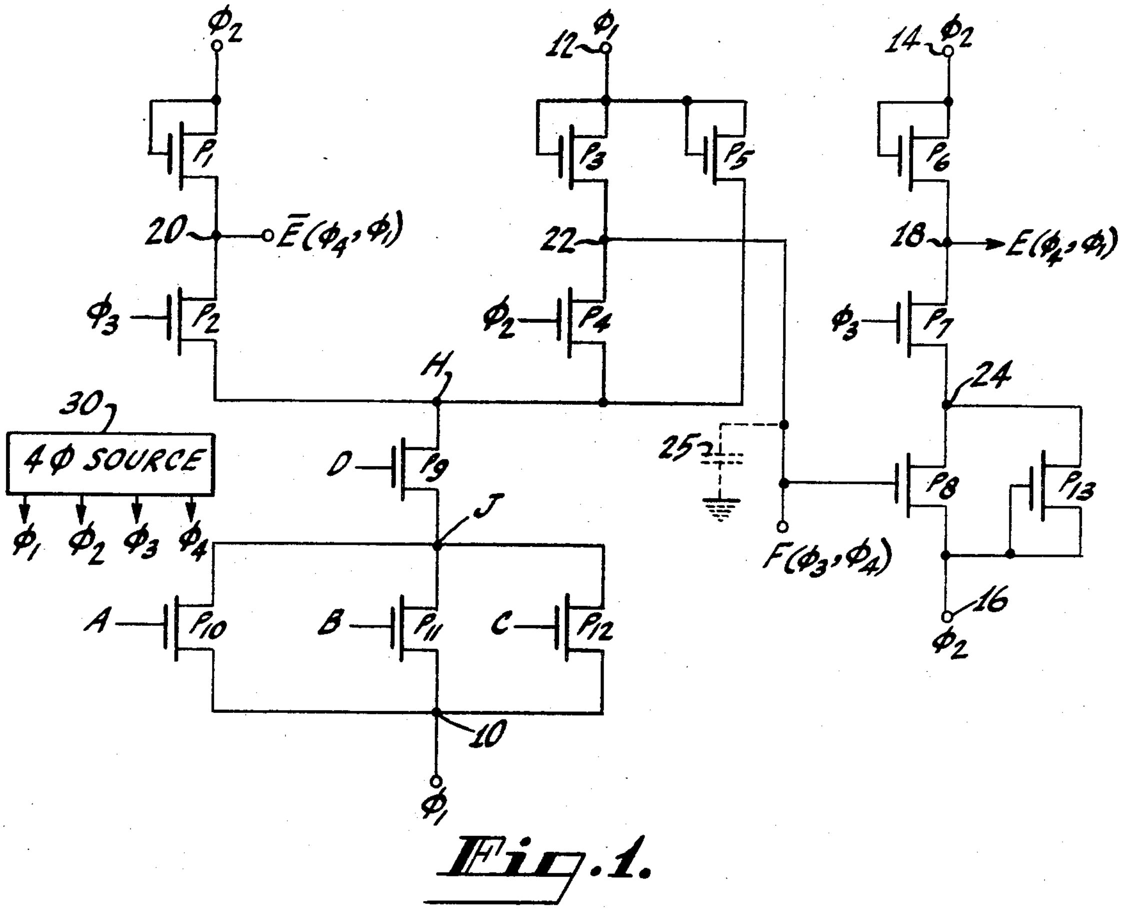
FIG. 1 is a schematic circuit diagram of an example of the invention.

The circuit of FIG. 1 includes 13 P-type MOS transistors $P_1, P_2, \ldots P_{13}$. The transistors $P_9$ through $P_{12}$ constitute the logic circuit itself. The conduction paths of transistors $P_{10}$, $P_{11}$, and $P_{12}$ are connected in parallel between circuit mode J and terminal 10 and these three transistors constitute an OR gate for the logic function A+B+C. The conduction path of transistor $P_9$ is connected between circuit modes J and H. As will be shown shortly, the addition of this transistor causes the logic circuit to implement the logic function (A+B+C)D.

The transistors $P_1$ through $P_5$ can be considered to be control transistors and their function will be discussed in detail shortly. Transistors $P_1$, $P_3$and $P_5$ are all connected gate electrode to drain electrode and operate as load resistors. The conduction path of transistor $P_2$ is connected between transistor $P_1$ and circuit node H and the conduction path of transistor $P_4$ is connected between transistor $P_3$ and node H. Transistor $P_5$ is connected between terminal 12 and node H.

The transistors $P_6$, $P_7$, and $P_8$ whose conduction paths are connected essentially in series between terminals 14 and 16 operate as an inverter. The output E present at node 18 is the logical complement (during the $\phi_4$ and $\phi_1$ pulses) of the output $\bar{E}$ present at node 20.

In the operation of the circuit of FIG. 1, assume that during the $\phi_2$ and $\phi_3$ times, A=1 and D=1, that is the voltage present at A and D is $-V$ and that B and C are 0 (are at ground). The A and D voltages are illustrated in FIG. 2; the B and C voltages are not illustrated because, in this example, they would simply appear as horizontal lines at the 0 level. During the preceding $\phi_1$ time, terminal 12 goes negative causing transistor $P_3$ to conduct and the conduction through this transistor charges the distributed capacitance present at node 22 to $-V$. This distributed capacitance is shown in phantom view at 25. It is to be understood that distributed capacitance to ground is also present at the other circuit nodes but to simplify the drawing, these capacitances are not shown. Further, to simplify the discussion which follows, rather than stating that the distributed capacitance or storage means at a node is charged, it is stated that the node is charged. The $-V$ present at node 22 places transistor $P_8$ in its low impedance condition. Accordingly, the voltage present at terminal 16, which is ground potential at $\phi_1$ time, discharges any voltage which may be present at node 24 and node 24 assumes ground potential.

During $\phi_1$ time, transistor $P_5$ is also driven into conduction so that node H becomes charged to $-V$. As no information is present during $\phi_1$ time, there is no low impedance path from node H to terminal 10 so that H remains at $-V$. (As an aside, even if information were present, H would remain at $-V$ because node 10 is at $-V$.)

During $\phi_2$ time, the information signals A, B, C and D becomes available. As mentioned above, A and D are 1 so that the conduction paths of transistors $P_9$ and $P_{10}$ are placed in their low impedance state. Transistors $P_{11}$ and $P_{12}$ remain off. However, as they are shunted by the conduction path of transistor $P_{10}$, they have no effect on this example of the circuit operation.

During $\phi_2$ time, transistor $P_4$ is turned on. As node 22 is at −V, current flows through the conduction paths of transistors $P_4$, $P_9$, and $P_{10}$ to node 10 which is at ground during the $\phi_2$ time. Accordingly, node 22 is placed at ground, that is F=0.

During $\phi_2$ time, terminals 14 and 16 of the inverter are at −V. Transistor $P_8$ does not conduct because F=0, that is, the gate electrode of transistor $P_8$ is at ground. However, transistor $P_{13}$ conducts charging node 24 to −V volts. Transistor $P_6$ conducts and this causes node 18 to become charged to −V, that is E=1.

Transistor $P_1$ is driven into conduction during $\phi_2$ time. This causes circuit node 20 to charge to −V, that is $\bar{E}$=1. While node H is at ground, this does not affect node 20 because transistor $P_2$ is off.

During $\phi_3$ time, transistor $P_7$ is driven into conduction. However, transistor $P_8$ is off as F=0. Accordingly, no low impedance conduction path exists between node 18 and terminal 16 (which is at ground). Node 24, however, was charged to −V at $\phi_2$ time so that node 18 remains charged at −V, that is, E remains 1. Transistor $P_2$ is driven into conduction during $\phi_3$ time. During this same time interval, the information signals A and D are still present so that transistors $P_9$ and $P_{10}$ are on. Accordingly, current is conducted from node 20 through the conduction paths of transistors $P_2$, $P_9$ and $P_{10}$ to ground (terminal 10 is at ground) so that node 20 rises to ground potential ($\bar{E}$=0).

The phase 4 pulse $\phi_4$ is generated by the 4 phase pulse source 30, however, it is not employed in the present circuit. This fourth phase is shown merely for the sake of completeness and to aid the explanation of the timing. In practice, this phase 4 pulse is used in other portions of the logic network through which information signals are flowing as, for example, in the portion (not shown) employed to generate the signals A, B, C, and D.

Summarizing the operation discussed above, during phase 2 and phase 3 times, the information signals A, B, C, and D are present. During the phase 2 and 3 times, certain circuit nodes are charged (phase 2 time) and certain logic decisions are made (phase 3 time) relative to the complementary output signals E and $\bar{E}$. These complementary logic signals E and $\bar{E}$ are stored and are available for use during the following two clock periods $\phi_4$ and $\phi_1$. In this particular example, during these clock periods E=1 and $\bar{E}$=0. This is the correct result for this particular example in which A=1 (so that A+B+C=1) and D=1 (so that (A+B+C)D=1 and $\overline{(A+B+C)D}$=0).

It is also clear from the explanation above that during phase 1 time certain circuit nodes are charged and during phase 2 time certain decisions are made with respect to the logic function F. The signal F indicative of the same logic function as $\bar{E}$ becomes available for use to the outside world and is stored during pulses $\phi_3$ and $\phi_4$. Thus, using a common logic network consisting of 4 transistors $P_9$ through $P_{12}$, signals $\bar{E}$ and F indicative of the same logic function are produced during different time intervals. Duplication of the same logic elements is avoided and the additional control elements needed are trivial.

The operation discussed above is illustrated at the left portion of FIG. 2. FIG. 2 also illustrates a second example, namely the operation of the circuit when A=1 and D=0. Here the values of B and C do not affect the circuit operation. (Nor, as a matter of fact does the value of A. So long as D is 0, E will be 0 and F will be 1.)

It is to be understood that the logic function discussed in detail above is merely one example of the present invention. Many others could be given. For example, if say transistors $P_{10}$ and $P_{12}$ are removed, the logic circuit will produce an output E=DB (the AND function). In this same case, of course, $\bar{E}$ represents the NAND function. In similar fashion, the transistor $P_9$ may be removed and node H directly connected to node J and in this case E=A+B+C, that is, the circuit produces an output indicative of the OR function. In this case, of course, $\bar{E}$ is indicative of the NOR function. Many other examples using different interconnections of logic elements in the logic circuit could be given and are intended to be within the scope of the present invention. In all of these cases F and $\bar{E}$ are indicative of the same logic function but are available during different time intervals.

What is claimed is:

1. In combination:

a logic circuit responsive to signals indicative of a plurality of variables present during a first time interval for producing a first output H indicative of a logic function of these variables during at least a portion of this time interval;

first control circuit means for sensing the value of this output H during one portion of said first time interval for producing an output F indicative of said logic function during a second time interval; and second control circuit means for sensing the value of output H during another portion of said first time interval, for producing an output indicative of the same logic function as F during a third time interval different than said second time interval.

2. The combination set forth in claim 1 further including means for producing successive clock pulses $\phi_1$, $\phi_2$, $\phi_3$, $\phi_4$, and wherein said signals indicative of variables are present during the interval of clock pulses $\phi_2$ and $\phi_3$, wherein said first control circuit means includes means for sensing the value of said output H of said logic circuit during the interval of clock pulse $\phi_2$ and includes means for storing said output F during the interval of clock pulses $\phi_3$ and $\phi_4$, and wherein said second control means includes means for sensing the value of H during the interval of clock pulse $\phi_3$ and means for storing said output it produces for a third time interval of duration equal to that of clock pulses $\phi_4$ and $\phi_1$.

3. In combination:

a logic circuit comprising a plurality of field-effect transistors the conduction paths of which are interconnected between first and second circuit nodes;

means for applying input signals indicative of binary variables to the gate electrodes of said transistors during a first time interval for causing a low impedance via the conduction paths of one or more of said transistors to exist between said two nodes for given combinations of said variables and for causing a high impedance to exist between said two nodes for the remaining combinations of said variables;

a third circuit node;

means for charging said third circuit node to a voltage level indicative of a bit of given binary value during a first clock pulse interval prior to the time said information signals are present;

a switch connected between said third and said second nodes;

means responsive to a second clock pulse which occurs during the time said input signals are present for closing said switch;

means for placing said first circuit node at a point of reference potential concurrently with the closing of said switch;

a fourth circuit node;

means for charging said fourth circuit node to a voltage level indicative of said bit of given binary value during said second clock pulse interval;

a fifth circuit node;

a switch in a path connected at one end to said fifth circuit node and having also a second end, said switch coupled to said third circuit node and controlled by the voltage present at said third circuit node;

means responsive to a third clock pulse after said second clock pulse for connecting said fourth circuit node to the second end of said path; and means for placing said fifth circuit node at a point of reference potential during said third clock pulse.

4. In combination:

a logic circuit comprising a network of switches connected between first and second circuit nodes;

means responsive to input signals indicative of binary variables for controlling said switches to provide at least one low impedance path, via at least one closed switch, between said two nodes for given combinations of values of the said binary variables and to provide a high impedance between said two nodes for the remaining combinations of values of said binary variables;

a third circuit node;

means for charging said third circuit node to a voltage level indicative of a bit of given binary value during a first clock pulse interval prior to the time said information signals are present;

a first control switch connected between said third and said second nodes;

means responsive to a second clock pulse which occurs during the time said input signals are present for closing said first control switch;

means for placing said first circuit node at a point of reference potential concurrently with the closing of said first control switch;

a fourth circuit node;

means for charging said fourth circuit node to a voltage level indicative of said bit of given binary value during said second clock pulse interval;

a fifth circuit node;

a switch in a path connected at one end to said fifth circuit node and having also a second end, said switch coupled to said third circuit node and controlled by the voltage present at said third circuit node;

means responsive to a third clock pulse after said second clock pulse for connecting said fourth circuit node to the second end of said path; and means for placing said fifth circuit node at a point of reference potential during said third clock pulse.

5. In the combination as set forth in claim 4 all of said switches comprising field-effect transistors.

6. In a logic circuit as set forth in claim 5 all of said field-effect transistors being of the same conductivity type.

7. In the combination as set forth in claim 4, each means for charging comprising a field-effect transistor connected gate electrode-to-drain electrode and connected at its source electrode to the circuit node being charged.

8. In combination:

a logic circuit responsive to signals indicative of a plurality of variables present during a first time interval for producing a first output H indicative of a logic function of these variables during at least a portion of this time interval;

first control circuit means for sensing the value of this output H during one portion of said first time interval for producing an output F indicative of said logic function during a second time interval; and second control circuit means for sensing the value of F during at least a portion of said second time interval, for producing an output E indicative of the complement of F during a third time interval different than said second time interval.

* * * * *